US011690474B2

(12) United States Patent
Coleman

(10) Patent No.: US 11,690,474 B2
(45) Date of Patent: Jul. 4, 2023

(54) HEATING APPARATUS

(71) Applicant: Paul Coleman, Halifax (GB)

(72) Inventor: Paul Coleman, Halifax (GB)

( * ) Notice: Subject to any disclaimer, the term of this patent is extended or adjusted under 35 U.S.C. 154(b) by 44 days.

(21) Appl. No.: 16/477,314

(22) PCT Filed: Jan. 15, 2018

(86) PCT No.: PCT/GB2018/050100
§ 371 (c)(1),
(2) Date: Jul. 11, 2019

(87) PCT Pub. No.: WO2018/134570
PCT Pub. Date: Jul. 26, 2018

(65) Prior Publication Data
US 2020/0029729 A1    Jan. 30, 2020

(30) Foreign Application Priority Data
Jan. 18, 2017 (GB) .................................... 1700860

(51) Int. Cl.
*A47J 31/44* (2006.01)
*A47J 31/54* (2006.01)
*A47J 31/057* (2006.01)

(52) U.S. Cl.
CPC ......... *A47J 31/545* (2013.01); *A47J 31/0573* (2013.01); *A47J 31/4403* (2013.01)

(58) Field of Classification Search
CPC .. A47J 31/0573; A47J 31/4403; A47J 31/545; A47J 31/542; A47J 31/54;
(Continued)

(56) References Cited

U.S. PATENT DOCUMENTS 4,177,767 A * 12/1979 Regamey ................ F01K 9/023
122/1 R
4,474,820 A * 10/1984 Hawes .................... A23F 5/505
426/387

(Continued)

FOREIGN PATENT DOCUMENTS

| DE | 19703096 A1 | 7/1998 |
|---|---|---|
| WO | 2011/006291 A1 | 1/2011 |
| WO | 2016/102218 A1 | 6/2016 |

OTHER PUBLICATIONS

WO 2016/102218 (Year: 2016).*

(Continued)

*Primary Examiner* — Helena Kosanovic
*Assistant Examiner* — Tiffany T Tran
(74) *Attorney, Agent, or Firm* — Oliff PLC

(57) ABSTRACT

A heating apparatus and method of heating. The embodiments of the invention relate to coffee machine heating apparatuses for providing heated brew water for passing through coffee grounds. The apparatus and method involves using low pressure steam (i.e. less than 1 bar absolute) at a saturation temperature that is substantially equal to the desired brew water temperature. Advantageously, improved temperature control of the brew water is achieved in a manner which is more convenient to an end user. The operating temperatures are more stable (the need for a "cooling flush" is removed) and the operating temperatures is reached in a quicker manner than with conventional machines.

8 Claims, 2 Drawing Sheets

(58) Field of Classification Search
CPC .. A47J 31/469; A47J 31/4489; A47J 31/4496; A47J 31/467; A47J 31/002; A47J 31/46; A47J 31/00; A47J 31/44
See application file for complete search history.

(56) References Cited

U.S. PATENT DOCUMENTS

| | | | | |
|---|---|---|---|---|
| 5,865,086 | A * | 2/1999 | Petichakis | B63H 11/12 |
| | | | | 91/4 R |
| 9,480,359 | B1 * | 11/2016 | Kalenian | A23F 5/32 |
| 2004/0177760 | A1 * | 9/2004 | Eicher | A47J 31/56 |
| | | | | 99/275 |
| 2007/0056994 | A1 * | 3/2007 | Woodnorth | A47J 31/54 |
| | | | | 222/221 |
| 2010/0005971 | A1 * | 1/2010 | Faccinti | A47J 31/469 |
| | | | | 99/281 |
| 2010/0018407 | A1 * | 1/2010 | Liu | A47J 31/465 |
| | | | | 99/302 R |
| 2012/0121765 | A1 * | 5/2012 | Kamerbeek | B65D 85/8046 |
| | | | | 426/77 |
| 2013/0263745 | A1 * | 10/2013 | Bombeck | A47J 31/24 |
| | | | | 99/293 |
| 2015/0216355 | A1 * | 8/2015 | Duvall | A47J 31/52 |
| | | | | 99/282 |
| 2016/0073819 | A1 * | 3/2016 | Licare | A47J 31/462 |
| | | | | 426/425 |
| 2016/0150911 | A1 * | 6/2016 | Upston | A47J 31/462 |
| | | | | 99/285 |
| 2017/0367527 | A1 | 12/2017 | Savioz | |
| 2019/0075963 | A1 * | 3/2019 | Kollep | A47J 31/4403 |

OTHER PUBLICATIONS

WO 2011/006291 (Year: 2011).*
DE 19703096 (Year: 1997).*
Definition of throttle valve (Year: 1828).*
Apr. 10, 2018 Search Report issued in International Patent Application No. PCT/GB2018/050100.
Apr. 10, 2018 Written Opinion issued in International Patent Application No. PCT/GB2018/050100.

* cited by examiner

HEATING APPARATUS

FIELD

The present invention relates to an apparatus for and method of heating drinking water. The invention is particularly, although not exclusively, related to coffee machines for providing heated brew water and steam. The expelled brew water is suitable for passing through coffee grounds and the steam is suitable for frothing milk.

BACKGROUND

Typically, high end, barista coffee machines found primarily in commercial environments must perform two basic functions at the same time. The first function involves producing hot water (around 94 degrees Celsius in order to optimally extract the coffee), also known as brew water, under high pressure (around 9 bar gauge) so that the brew water is forced through the coffee. The second function involves generating steam for expulsion into milk so at least part of the milk is expanded by enveloped air particles and turned into a foam-like substance (i.e. at least part of the milk is frothed). In order to produce hot drinks on demand (i.e. shot after shot) with consistent quality, the brew water must be ready to use at the desired operating temperature (around 94 degrees Celsius). However, when left idle (i.e. during quiet periods), some coffee machines require manual intervention before the brew water is ready. For example, conventional heat exchanger coffee machines require a "cooling flush" after long idle periods. This is because the brew water is exposed for too long to the higher temperatures of the steam boiler. Conventional heat exchanger coffee machines are therefore designed to control the temperature of the brew water by continuously moving the brew water through the heat exchanger so that the cold brew water reaches the optimum temperature (around 94 degrees Celsius) at the right time, rather than resting in close contact with the boiler and inevitably exceeding the optimum temperature. This results in a need to release the overheated brew water by continuously pushing the inlet water through the heat exchanger during a "cooling flush". One of the major drawbacks with conventional heat exchanger coffee machines is the lack of control of the brew water temperature which can lead to the overheating of brew water and the necessity of the "cooling flush".

Some conventional coffee machines rely on a dedicated reservoir for heating the brew water (e.g. conventional dual boiler coffee machines). This advantageously allows conventional dual boiler coffee machines to better control the brew water temperature because the hot water reservoir can be held close to the desired brew water temperature. However, for temperature stability, in most cases the hot water reservoir is large and the time taken to heat up the reservoir is inconvenient. As the water in the reservoir is not released as steam, a conventional steam boiler must still be included in the machine for frothing milk. Conventional dual boiler coffee machines are therefore bulky and have high power requirements.

It is an aim of the embodiments of the present invention to overcome at least some of the drawbacks of conventional coffee machines. It is desired to produce a solution that does not require a "cooling flush" to maintain control of the brew water temperature. An improved method of temperature control is therefore desired. A solution that results in quicker warm-up times is also desired. Overall, it is an aim to provide an apparatus and/or method that is better than conventional coffee machines.

SUMMARY

According to the present invention there is provided a method of operation and an apparatus as set forth in the appended independent claims. Other features of the invention will be apparent from the dependent claims, and the description which follows.

There is provided a method of heating drinking water. The method comprises the step of generating steam using a heat source. The heat source may be a boiler such as a gas or electric boiler. The heat source may therefore comprise a water reservoir for containing the water to be heated and turned to steam. The steam may be flash steam that is produced by flashing water (released from the boiler) to steam using a valve. The method further comprises transporting the steam generated by the heat source away from the heat source along a first passageway. The first passageway may comprise a network of piping that may interconnect various other components such as a steam enclosure and a valve. The method comprises transporting drinking water from an inlet along a second passageway and towards an outlet. Similarly to the first passageway, the second passageway may comprise a network of piping that may interconnect various other components such as a steam-water heat exchanger and a valve. The method involves transferring heat between the first and second passageways using a thermal conductor. The thermal conductor therefore exchanges heat between the first and second passageways in order to use steam provided in the first passageway to heat up drinking water provided in the second passageway. The thermal conductor comprises a coupler for coupling with a filter. The filter may be a coffee filter for connection with a group head. Finally, the method involves controlling the steam in contact with the thermal conductor to a pressure of less than 1 bar absolute. That is, the pressure of the steam to heat the drinking water does not exceed 1 bar absolute.

Preferably, the steam configured to heat the drinking water is saturated and has a pressure of between about 0.65 and about 0.9 bar absolute. Preferably, the steam pressure is controlled to between about 0.8 and about 0.9 bar absolute. Even more preferably, the steam pressure is controlled to between about 0.8 and about 0.82 bar absolute. Most preferably, the saturated steam pressure is approximately 0.81 bar absolute in order to provide a heating temperature of the steam that is equal to the saturation temperature at this pressure (approximately 94 degrees Celsius). Therefore, the method may comprise controlling the pressure of the steam in contact with the thermal conductor to a pressure whereby the saturation temperature is substantially equal to a desired drinking water temperature. Advantageously, the steam does not exceed the optimum temperature for extracting coffee.

The method may further comprise the step of transporting steam away from the heat source along a third passageway towards an exhaust, wherein the steam in the third passageway is at a pressure greater than 1 bar absolute. The method may further include exhausting steam from the exhaust, i.e. releasing the higher pressure steam to atmosphere. The steam in the first passageway is therefore low pressure steam (and preferably sub-atmospheric steam at sea level), whereas the steam in the third passageway is high pressure steam. Advantageously, low pressure steam is used to heat the drinking water.

The step of transferring heat may further comprise transferring heat between a first surface of the thermal conductor in fluid communication with the first passageway and a second surface of the thermal conductor in fluid communication with the second passageway. The thermal conductor may be a steam-to-drinking water heat exchanger located downstream of the drinking water outlet, which may be also downstream of a group head. A group head is an enclosure that is configured to receive a filter.

The step of controlling the steam may comprise maintaining a substantially constant pressure. The pressure may be controlled to within about ±0.1 bar of a target pressure and preferably within about ±0.01 bar of a target pressure.

The method may further comprise controlling the steam in the first passageway at substantially the saturation temperature. The saturation temperature may be equal to a desired drinking water temperature, which for extracting coffee is around 94 degrees Celsius. That is, the method may further comprise controlling the steam pressure in the first passageway so that the saturation temperature of the steam is equal to a desired drinking water temperature, which for extracting coffee is around 94 degrees Celsius. The saturation temperature of the steam may be set between about 88 and about 97 degrees Celsius. Preferably, the temperature of the steam is set between about 93 and about 97 degrees Celsius. Most preferably, the temperature of the steam is set between about 93.5 and about 94.2 degrees Celsius. Advantageously, the steam temperature does not exceed the optimum temperature for extracting coffee which avoids the need for a "cooling flush".

The method may further comprise controlling the pressure of the steam in the first passageway using a valve. The valve may be an electro-mechanical valve such as a solenoid.

The method may further comprise controlling the temperature of the steam in the first passageway by passing the steam through a de-superheater. The de-superheater may be an enclosure having a water bath, an inlet through which the steam is passed into the water bath and an outlet through which saturated steam is emitted.

The step of transferring heat may comprise transferring heat through heat conducting fins that protrude into the first passageway. The fins may be made of copper or brass.

There is also provided an apparatus for heating drinking water. The apparatus comprises a heat source for generating steam. The heat source may be a boiler such as a gas or electric boiler. The heat source may therefore comprise a water reservoir for containing the water to be heated and turned to steam. The apparatus further comprises a first passageway that is in fluid communication with the heat source and is for transporting steam away from the heat source. The first passageway may comprise a network of piping that may interconnect various other components such as a steam enclosure (i.e. a pressure vessel) and a valve. The apparatus further comprises an inlet for receiving drinking water and an outlet for expelling drinking water. The apparatus further comprises a second passageway that is in fluid communication with the inlet and outlet. Similarly to the first passageway, the second passageway may comprise a network of piping that may interconnect various other components such as a steam-water heat exchanger and a valve. The apparatus further comprises a thermal conductor for transferring heat between the first and second passageways, wherein the first passageway is configured for transporting steam at a pressure of less than 1 bar absolute. That is, the apparatus may comprise a controller for maintaining the pressure of the steam to not exceed 1 bar absolute. Preferably, the first passageway is configured for transporting saturated steam at a pressure of between about 0.65 and about 0.9 bar absolute. Preferably, the steam pressure is controlled to between about 0.8 and about 0.9 bar absolute. Even more preferably, the steam pressure is controlled to between about 0.8 and about 0.82 bar absolute. Most preferably, the saturated steam pressure is approximately 0.81 bar absolute in order to provide a heating temperature of the steam that is equal to the saturation temperature at this pressure (approximately 94 degrees Celsius).

The apparatus according may comprise a third passageway in fluid communication with the heat source for transporting steam away from the heat source. The third passageway may comprise an exhaust for exhausting steam, whereby the third passageway is configured for transporting steam at a pressure of greater than 1 bar absolute.

The thermal conductor may comprise a first surface in fluid communication with the first passageway and a second surface in fluid communication with the second passageway.

The apparatus may comprise a valve for reducing steam pressure from the heat source to the second passageway. The valve may be an electro-mechanical valve such as a solenoid.

The first passageway may comprise a de-superheater interposed between the thermal conductor and the heat source. The de-superheater may be an enclosure having a water bath, an inlet through which the steam is passed into the water bath and an outlet through which saturated steam is emitted.

The first passageway may comprise a pressure vessel at least partially enclosing a group head. The group head may be the thermal conductor.

The thermal conductor may comprise a coupler for coupling with a filter. That is, the coupler may be a group head. The filter may be a coffee filter for connection with the coupler or group head. The coupler or group head may comprise heat conducting fins. The heat conducting fins may protrude into the first passageway. The fins may be made of copper or brass for providing high thermal conductivity.

Although a few preferred embodiments have been shown and described, it will be appreciated by those skilled in the art that various changes and modifications might be made without departing from the scope of the invention, as defined in the appended claims.

BRIEF DESCRIPTION OF DRAWINGS

For a better understanding of the invention, and to show how embodiments of the same may be carried into effect, reference will now be made, by way of example, to the accompanying diagrammatic drawings.

DESCRIPTION OF EMBODIMENTS

Figure 1:
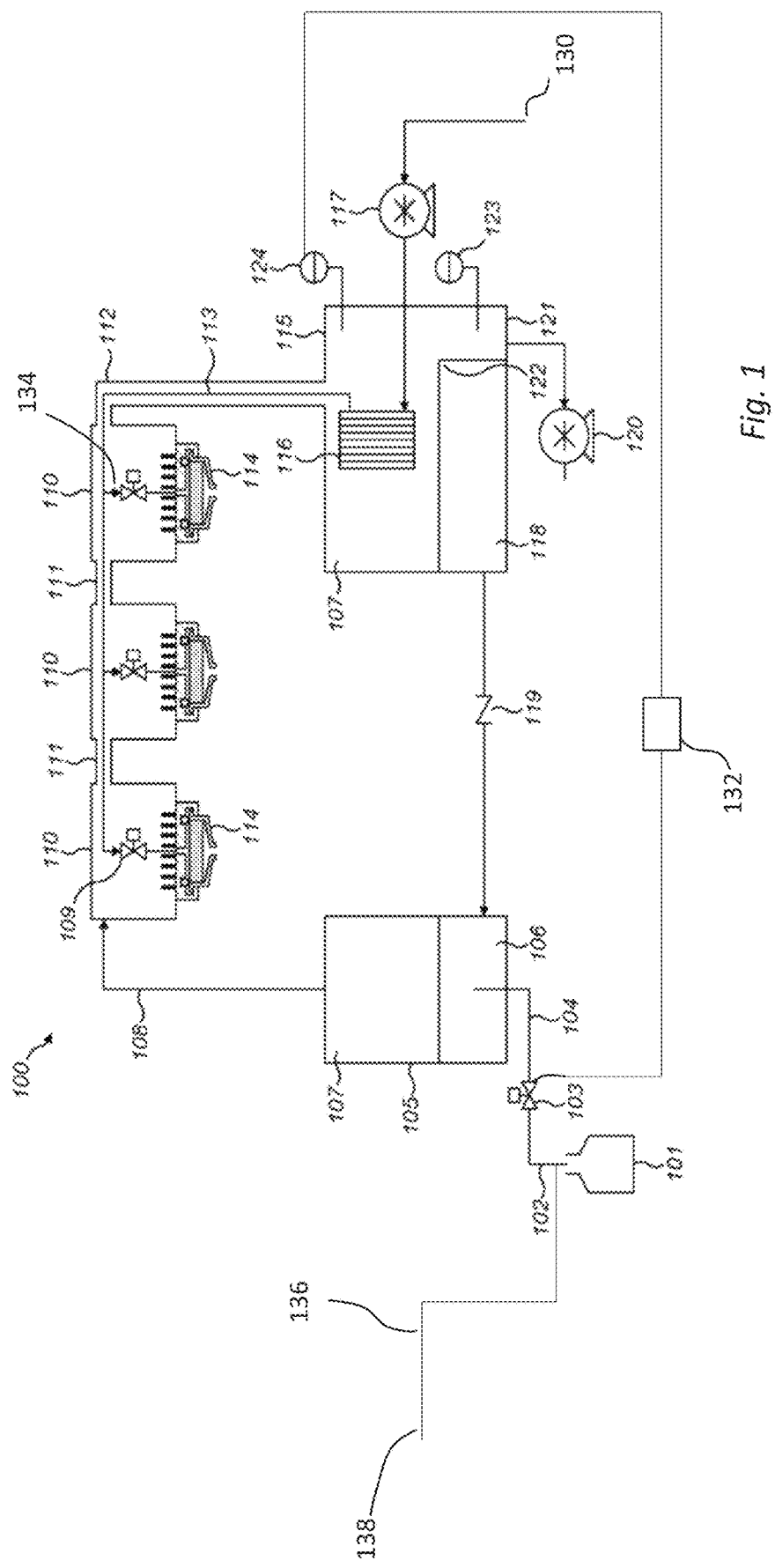
FIG. 1 shows a heating apparatus for heating drinking water.
Figure 2:
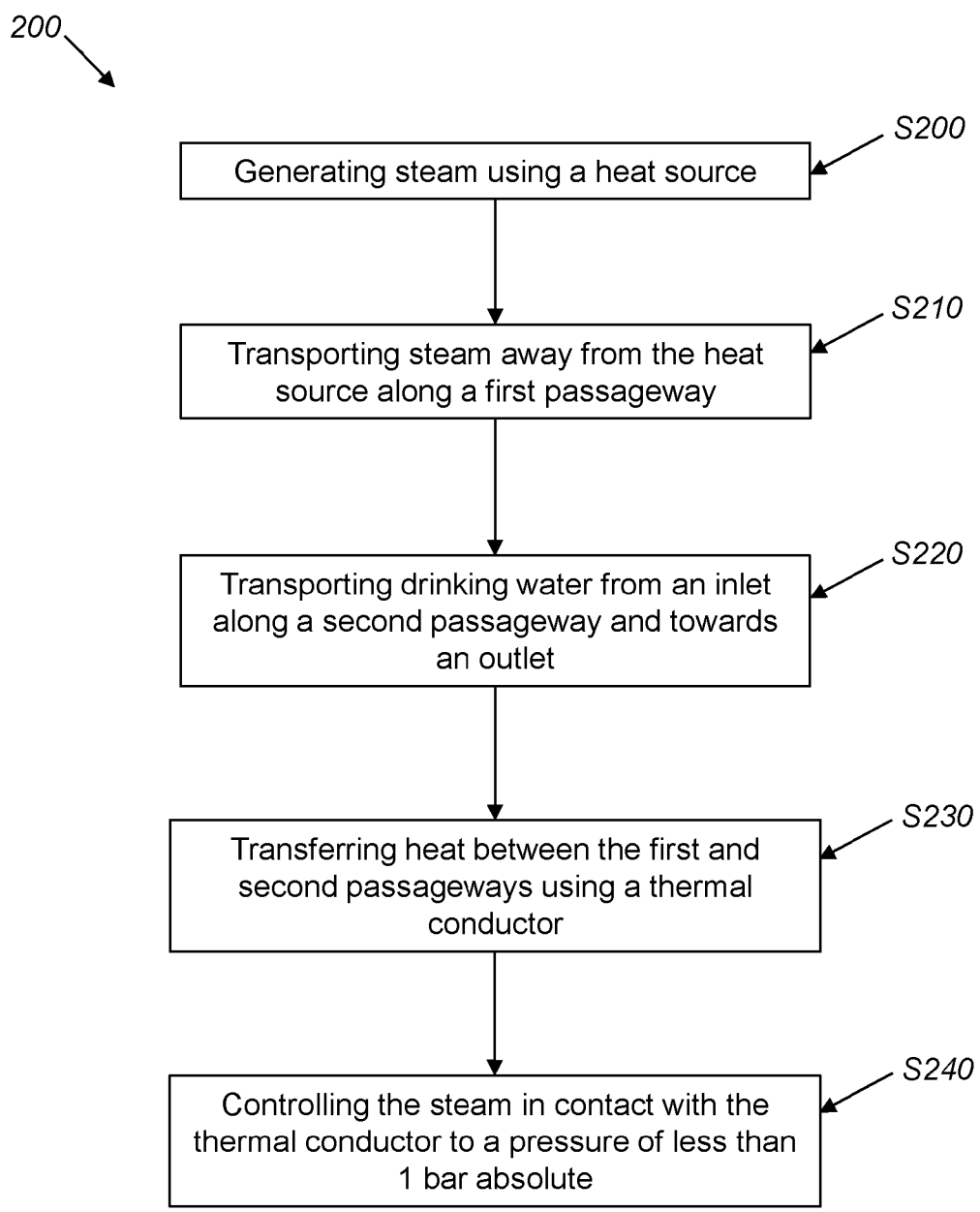
FIG. 2 shows a flow diagram showing the method of heating drinking water.

A heating apparatus 100 and method 200 are shown in FIGS. 1 and 2, respectively. Here, in step S200 steam is generated by heating water using a heat source 101. The heat source 101 is therefore a steam generator (or boiler) that is configured to generate steam at elevated pressure (at least about 1 bar absolute and preferably between about 2 and 3 bar absolute). The heat source 101 is therefore in fluid communication with a water supply (not shown) that supplies water to the heat source 101 for conversion into steam. The water supply is connected to the heat source 101 so that water can be added on demand, for example through the use of a control valve (not shown). Furthermore, the heat source

101 may have an outlet, e.g., exhaust 138, for expelling steam, e.g., through a third passageway 136, away from the heat source 101 for frothing milk.

The steam generated by the heat source 101 may be provided in a saturated state at about 2 bar absolute pressure and about 120 degrees Celsius through a pipe 102 towards a throttle valve 103. The pipe 102 is part of a first passageway that is in fluid communication with the heat source 101 for transporting steam away from the heat source 101 in step S210. The actual pressure of the steam produced in the heat source 101 may be optimised for the milk frothing process. The throttle valve 103 is therefore a pressure control valve that is capable of reducing the pressure of the steam.

The throttle valve 103 is operated by a controller 132 that opens and closes the valve as required to control the flow of steam into the heating apparatus. A pressure sensor 124 positioned downstream and after a plurality of enclosures 110 in order to measure the pressure of the steam and maintain the pressure of the steam in the enclosures 110 and 115 at a desired pressure, Ps, that is less than 1 bar absolute pressure (preferably around 0.81 bar absolute pressure because at this steam pressure the saturated steam temperature, Ts, is about 94 degrees Celsius, which is the optimum temperature for extracting coffee) in step S240. That is, the steam is provided at sub-atmospheric pressure at sea level. The benefit of using saturated steam as a heating medium is that at the saturation temperature a large amount of heat can be transferred away from the steam without changing the steam's temperature due to the latent heat of the steam.

After being expanded in throttle valve 103, the steam leaving the throttle valve 103 is pressurised at a pressure slightly exceeding 0.81 bar absolute pressure and in a superheated state.

The superheated steam passes through a further pipe 104 of the first passageway that interconnects the throttle valve 103 and a de-superheater 105. The de-superheater 105 comprises a water bath 106 (i.e. a reservoir) into which the steam can emerge. For example, the steam is shown to be inputted below the surface of the water reservoir 106.

The temperature of the water in the reservoir 106 is raised by the superheated steam to a point of saturation. This causes the water in the reservoir 106 to boil and to in turn produce saturated steam 107 at slightly over the desired saturated steam temperature, Ts, of the steam (i.e. about 94 degrees Celsius when the steam pressure is 0.81 bar absolute pressure).

The saturated steam 107 passes through a further pipe 108 of the first passageway and towards a first enclosure 110. The enclosure 110 is an air-tight, pressure vessel that encloses the steam 107. The steam 107 transfers heat from the steam 107 to the walls of the first enclosure 110 in order to heat up the first enclosure 110 and keep the first enclosure 110 warm. The enclosure 110 acts as a thermal conductor to transfer heat to the brew water that is contained within a second passageway in step S230. Heat is therefore transferred from the steam 107 in the enclosure 110 to the body of a brew water control valve 109 and the body of a group head enclosure 114. Here, the group head enclosure 114 is a dispensing unit that dispenses heated brew water through coffee provided in a filter that is attached to the dispensing unit. The group head enclosure 114 is therefore a further thermal conductor that heats up in response to the presence of the low pressure steam 107. Heat conducting fins are configured to protrude from the group head enclosure 114 into the first passageway in order to increase the rate of heat transfer between the steam 107 and ultimately the brew water.

A plurality of enclosures 110, each containing group head enclosures 114 and brew water control valves 109 are connected in series in order to provide independently controllable dispensers. The steam 107 passes through a further pipe 111 of the first passageway between each dispensing unit 114 that connects the plurality of enclosures 110 in line. As the steam 107 condenses due to the heat transferred to each enclosure 110, condensate is formed in the enclosure 110 and is carried away by the pipe 111.

Steam 107 and condensate exit the last inline enclosure 110 through a further pipe 112 of the first passageway and enter enclosure 115. Condensate 118 collects in the base of the enclosure 115. Condensate 118 flows through check valve 119 into de-superheater 105 to replace any water in the reservoir 106 that is lost by evaporation. Any excess condensate 118 overflows a weir 122 and into a condensate well 121 and is finally drained by a condensate drain pump 120 and exits the system. A temperature sensor 123 may be used to detect the condensate present in the well 121 so that the drain pump 120 is turned on only when necessary.

The condensate pump 120 is operated by a controller (not shown), temperature sensor 123 and pressure sensor 124. The controller (not shown) converts the pressure sensed by pressure sensor 124 into an equivalent saturation temperature. If the temperature measured by the temperature sensor 123 is below the saturation temperature derived from the measured pressure, the presence of condensate or non-condensable gasses at point 121 is detected and the condensate drain pump 120 is started.

The brew water is supplied to the system by a pump 117 that pressurises the water from a water supply (not shown). Essentially, the brew water is transported from an inlet 130 along a second passageway and towards an outlet 134 in step S220. The pump 117 is therefore part of the second passageway. Preferably, the pressure of the brew water is controlled at a brewing pressure of around 10 bar absolute. The pressurised brew water is then conveyed (i.e. transported) to a heat exchanger 116 that is exposed to the steam 107. The heat exchanger 116 acts as a thermal conductor to transfer heat between the first and second passageways in step S230. The heat exchanger 116 may be a shell and tube type heat exchanger or a plate type heat exchanger (e.g. plate and fin). The brew water within the second passageway is heated by the steam 107 to a temperature approaching the saturation temperature, Ts, of the steam 107 of 94 degrees Celsius. Advantageously, the heat exchange process relies on a lower thermal mass, particularly compared to conventional dual boiler coffee machines. This also allows faster heat up times to be achieved. Beneficially, each group head enclosure 114 can be located far from the heat source 101 and/or heat exchanger 116 in a remote location. For example, the group head enclosure 114 may be provided on the top of a counter of a workstation (i.e. on the worktop or surface that is used by the barista for dispensing coffee) and the heat source 101 and/or heat exchanger 116 may be provided below the top of the counter. Beneficially, this maximises the working area for preparing coffee so that the heat generating and the bulk of the heat transferring components are arranged away from a preparation zone.

The heated brew water is then passed through a pipe 113 of the second passageway and toward a plurality of control valves 109. The pipe 113 of the second passageway is contained within the steam pipes 112 and 111 in order to transfer heat between the first and second passageways. The walls of the steam pipes 112 and 111 therefore act as a thermal conductor in step S230.

To dispense coffee, one of the control valves 109 opens to deliver high pressure heated brew water (i.e. far greater than 1 bar absolute and possibly around 8 bar absolute or 9 bar gauge at sea level) to the dispensing unit 114 from which the brew water can enter coffee grounds once a filter is attached to the dispensing unit 114.

Advantageously, when the system is idle and the brew water is not continuously moving through the second passageway, the temperature of the brew water in the pipes 113 of the second passageway are maintained by the temperature of the steam 107. This produces an accurately controllable system that is capable of providing a stable brew water temperature. Furthermore, since the temperature of the steam 107 is always close to the desired saturated temperature, Ts (i.e. 94 degrees Celsius), the brew water cannot overheat.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for heating drinking water, the apparatus comprising:
   a heat source for generating steam;
   a first passageway in fluid communication with and directly connected to the heat source for transporting the steam away from the heat source;
   a valve for reducing steam pressure from the heat source to the first passageway;
   an inlet for receiving the drinking water;
   an outlet for expelling the drinking water;
   a second passageway, distinct from the first passageway, in fluid communication with the inlet and the outlet and configured to convey the drinking water from the inlet to the outlet;
   a heat exchanger for transferring heat between the first and second passageways, the second passageway including a portion for conveying the drinking water, which has been heated at the heat exchanger, to the outlet;
   a first pump for delivering water to the second passageway;
   a second pump for draining water or non-condensable gasses from the first passageway, and
   a controller for maintaining pressure of the steam within the first passageway at a pressure of less than 1 bar absolute, wherein
   the first passageway (i) comprises a de-superheater interposed between the heat source and the heat exchanger and (ii) is configured to convey the steam from the heat source, to the de-superheater, and then to the heat exchanger, and
   the valve is located in the first passageway (i) between the heat source and the heat exchanger and (ii) between the heat source and the de-superheater.

2. The apparatus according to claim 1, wherein the heat exchanger comprises a first surface in fluid communication with the first passageway and a second surface in fluid communication with the second passageway.

3. The apparatus according to claim 1, further comprising a coupler for coupling with a filter, wherein the coupler comprises heat conducting fins that protrude into the first passageway.

4. The apparatus according to claim 1, wherein the first passageway includes an enclosure for collecting the water or non-condensable gasses.

5. The apparatus according to claim 1, wherein the first passageway includes a temperature sensor.

6. The apparatus according to claim 1, wherein the first passageway is configured for transporting steam at a pressure of greater than about 0.65 bar absolute.

7. The apparatus according to claim 1, further comprising:
   a first enclosure interposed between the heat exchanger and the heat source, the first enclosure constituting the de-superheater that mixes steam generated by the heat source with water;
   a second, air-tight enclosure connected to the first enclosure by way of a first pipe of the first passageway, the second enclosure constituting a thermal conductor for transferring heat from the first passageway to the second passageway; and
   a third enclosure connected to the second enclosure by way of a second pipe of the first passageway, the third enclosure containing the water or non-condensable gasses to be drained from the first passageway by the second pump, wherein:
   the inlet for receiving drinking water is connected to the second enclosure by way of the first pump and the heat exchanger, and
   the outlet for expelling the drinking water is provided at the second enclosure.

8. The apparatus according to claim 7, wherein the third enclosure and the first enclosure are connected so that condensate flows from the third enclosure to the first enclosure.

* * * * *